Jan. 30, 1923. Re. 15,534

F. G. WHITTINGTON.

INSTRUMENT MOUNT FOR AUTOMOBILE INSTRUMENT BOARDS.

ORIGINAL FILED MAR. 15, 1921.

Witness.
A. G. McKnight.

INVENTOR.
Frederick G. Whittington
By Burton & Burton
his ATTORNEYS.

Reissued Jan. 30, 1923. Re. 15,534

UNITED STATES PATENT OFFICE.

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

INSTRUMENT MOUNT FOR AUTOMOBILE INSTRUMENT BOARDS.

Original No. 1,371,337, dated March 15, 1921, Serial No. 349,032, filed January 2, 1920. Application for reissue filed July 3, 1922. Serial No. 573,061.

*To all whom it may concern:*

Be it known that I, FREDERIK G. WHITTINGTON, a citizen of the United States, residing at Chicago, in the county of Cook and State of Illinois, have invented new and useful Improvements in Instrument Mounts for Automobile Instrument Boards, of which the following is a specification, reference being had to the accompanying drawings, forming a part thereof.

The purpose of this invention is to provide an improved mount for securing an instrument upon the instrument board of an automobile. It consists in the elements and features of construction shown and described, as indicated in the claims.

In the drawings:—

Figure 1:
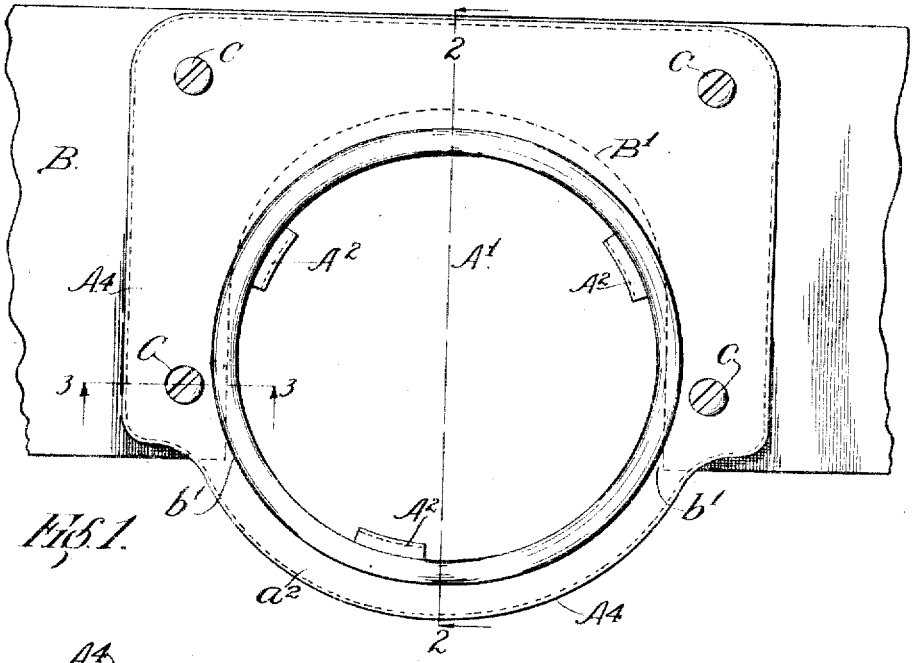
Figure 1 is a forward side elevation of an instrument board provided with an instrument mount embodying this invention.
Figure 2:
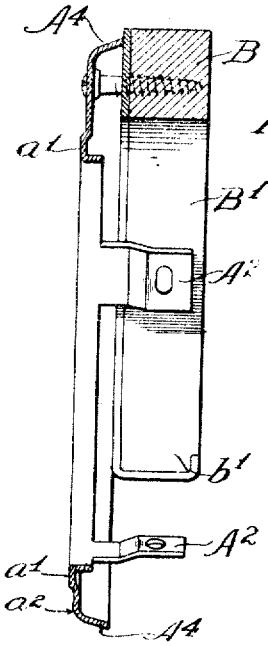
Figure 2 is a section at the line, 2—2, on Figure 1.
Figure 3:
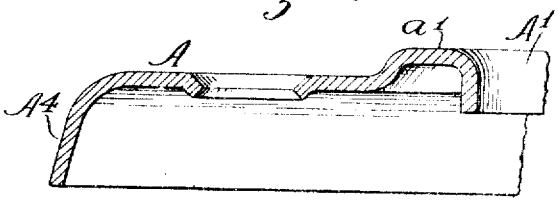
Figure 3 is a section at the lines 3—3—3 on Figure 1.

It will be understood that the instrument board with which an automobile may be provided in its standard construction, is designed to be cut subsequently to the construction for mounting upon it various instruments, the bulk of which preferably protrudes behind the board, the instrument protruding through the board only to expose the parts necessary for reference for reading or manipulation. When the board is of wood only, the necessary apertures for the instrument or instruments to be mounted upon it may usually be cut by means of tools readily accessible and requiring no special expertness. But when this board is of metal or is metal covered, it is a difficult matter, usually requiring special tools and considerable expertness, to cut an aperture through the metal and the wood, in which the instrument will fit neatly.

To obviate this difficulty and provide a finish for the aperture so that the sometimes unavoidable irregularity of it when cut by the conveniently available tool shall not be apparent and thereby constitute a disfigurement, the present invention provides a mount adapted to be applied to the face of the instrument board and to receive the instrument in an aperture with which it is provided, while concealing the margins of the aperture which may be made in the board, and also bridging over the gap in the edge of the board made by the aperture or the necessary cut to reach the aperture in order to cut it by a saw, and reinforcing or restoring the strength to the board which might be weakened by such gap.

As shown in the drawings the mount consists of a plate or shell, A, which may be stamped from sheet metal or otherwise formed integrally, having an aperture, $A^1$, to accommodate the instrument for which it is designed, and provided with an up-raised bead, $a^1$, around this aperture from which project lugs, $A^2$, $A^2$, positioned for securing the instrument, and also adapted to be secured to the edge of the aperture, $B^1$, which will be cut in the board, B, if the same is cut with sufficient accuracy. The contour of the mount is designed so that it shall have a portion as $a^2$, overhanging or projecting beyond the edge of the board, B, through which the gap, $b^1$, is made by the aperture, $B^1$, through which the instrument is to be inserted; and the margin of the mount throughout the periphery which laps on the board, is provided with a flange, $A^4$, which constitutes the bearing of the mount upon the board, stiffening the mount and adapting it to stiffen the board. The mount being secured to the board by screws, C, inserted through the mount at points at opposite sides of the gap, not only restores but increases the rigidity of the board where it is weakened by the gap; and at the same time the gap is effectually concealed by the mount overlapping it. It will be understood that the remainder of the marginal outline of the mount may be in any form desired for neat or ornamental appearance, and that additional securements of the mount to the board besides those adapted to reinforce it across the gap, may be provided to any extent, as indicated by two additional screws or bolts shown at $C^1$, $C^1$.

I claim:—

1. The combination with an automobile instrument board having an aperture therein, said aperture opening out through one edge of the board thus forming a gap in that edge for accommodating an instrument therein, of an instrument mount secured to and in the plane of the face of the board having a portion thereof overhanging the edge of said board in the said plane spanning the said gap, said overhanging portion including a circumscribing support for the instrument.

2. In the construction defined in claim 1, foregoing, the mount having lugs extending into the instrument aperture of the board for securing the instrument thereto within the aperture.

3. In the construction defined in claim 1, the mount having a right angled flange extending along the entire outer margin thereof.

4. In the construction defined in claim 1, the securing means being releasable to permit removing the instrument from the board through the gap without detaching the mount or other devices from the instrument.

5. The combination with an automobile instrument board having an aperture therein, said aperture opening out to one edge of the board, thus forming a gap at that edge for admitting an instrument thereinto, of a plate apertured to fit the outline of the instrument and laterally extended from its instrument-fitting aperture adequately for closing and concealing the margin of the gap made in the instrument board to admit the instrument, and for lapping on said margin adequately for securement thereto, said plate being marginally flanged for stiffening it in its plane and for seating on the board.

In testimony whereof, I have hereunto set my hand at Chicago, Illinois, this 9th day of June, 1922.

FREDERIK G. WHITTINGTON.

Certificate of Correction.

It is hereby certified that in Reissue Letters Patent No. 15,534, granted January 30, 1923, upon the application of Frederik G. Whittington, of Chicago, Illinois, for an improvement in "Instrument Mounts for Automobile Instrument Boards," errors appear in the printed specification requiring correction as follows: Page 2, line 23, claim 5, for the word "to" read *through;* same page and claim, line 29, for the word "closing" read *covering;* and that the said Letters Patent should be read with these corrections therein that the same may conform to the record of the case in the Patent Office.

Signed and sealed this 16th day of December, A. D. 1924.

[SEAL.]

KARL FENNING,
*Acting Commissioner of Patents.*